United States Patent
Lee et al.

(10) Patent No.: US 7,728,236 B2
(45) Date of Patent: Jun. 1, 2010

(54) KEYPAD AND KEYPAD ASSEMBLY

(75) Inventors: Joo-Hoon Lee, Yongin-si (KR); Sun-Tae Jung, Anyang-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 112 days.

(21) Appl. No.: 11/820,870

(22) Filed: Jun. 20, 2007

(65) Prior Publication Data

US 2008/0011596 A1  Jan. 17, 2008

(30) Foreign Application Priority Data

Jul. 14, 2006  (KR) .................... 10-2006-0066260

(51) Int. Cl.
*H01H 9/26* (2006.01)

(52) U.S. Cl. ...................... 200/5 A; 200/341

(58) Field of Classification Search ......... 200/310–315, 200/341–345, 512–520, 5 A
See application file for complete search history.

(56) References Cited

U.S. PATENT DOCUMENTS

| | | | | |
|---|---|---|---|---|
| 3,995,126 | A * | 11/1976 | Larson | 200/5 A |
| 4,060,703 | A | 11/1977 | Everett, Jr. | 200/5 A |
| 5,521,345 | A * | 5/1996 | Wulc | 200/317 |
| 6,993,830 | B2 * | 2/2006 | Shimizu et al. | 29/622 |
| 7,414,213 | B2 * | 8/2008 | Hwang et al. | 200/341 |
| 7,473,860 | B2 * | 1/2009 | Sample | 200/302.1 |
| 7,546,039 | B1 * | 6/2009 | Boroditsky et al. | 398/152 |
| 7,546,540 | B2 * | 6/2009 | Baudisch et al. | 715/761 |
| 2003/0058223 | A1 | 3/2003 | Tracy et al. | |
| 2004/0217939 | A1 | 11/2004 | Levy et al. | |
| 2008/0055274 | A1 * | 3/2008 | Van Berkel et al. | 345/174 |

FOREIGN PATENT DOCUMENTS

| | | |
|---|---|---|
| EP | 0859498 | 8/1998 |
| EP | 1079584 | 2/2001 |
| JP | 2004-145648 | 5/2004 |
| JP | 2005-352987 | 12/2005 |
| KR | 10-0429449 | 5/2004 |
| KR | 2006-16534 | 2/2006 |
| WO | WO 2005/024869 | 3/2005 |

* cited by examiner

*Primary Examiner*—Renee Luebke
*Assistant Examiner*—Lisa Klaus
(74) *Attorney, Agent, or Firm*—Cha & Reiter, LLC

(57) ABSTRACT

A keypad includes an elastic layer for providing a restoring force to the keypad and an electric paper on the elastic layer, in which a plurality of key button regions for providing symbols in the form of images are defined. A keypad assembly includes a keypad, which has an elastic layer for providing a restoring force to the keypad and an electric paper on the elastic layer, in which a plurality of key button regions for providing symbols in the form of images are defined, and a switch board under the keypad for converting a pressure applied by a user to the key button region into an electric contact.

15 Claims, 5 Drawing Sheets

321

322

323

KEYPAD AND KEYPAD ASSEMBLY

CLAIM OF PRIORITY

This application claims priority under 35 U.S.C. §119 to an application entitled "Keypad and Keypad Assembly," filed in the Korean Intellectual Property Office on Jul. 14, 2006 and assigned Serial No. 2006-66260, the contents of which are incorporated herein by reference.

BACKGROUND OF THE INVENTION

1. Field of the Invention

The present invention generally relates to a keypad, and in particular, to a keypad and a keypad assembly for a portable communication terminal.

2. Description of the Related Art

Portable communication terminals are evolving into complex multi-functional devices capable of providing various functions. Thus, a keypad of the portable communication terminal has to support characters and special characters in addition to numbers, and their size has to be fit accordingly due to the characteristic of a portable device.

A general qwerty-type keypad can be mounted in a portable communication terminal to input characters, but its large volume may become an issue due. These days, the keypad mounted in the portable communication terminal needs to provide a plurality of characters, numbers and special characters in a single key button.

A general keypad mounted in the portable terminal usually serves as a number input means for selecting a phone number. A character coining method in which characters, numbers, and special characters on a display device are selected with a single key may be used. In addition, the portable communication terminal may include a touch screen as an input means. However, in a touch screen type input device, a user cannot feel the activation of a key during operation.

If the user cannot feel the press of a key or cannot accurately press the desired key, the user may press adjacent another key, causing inaccurate manipulation of the keypad. Moreover, in a keypad supporting a plurality of characters with a single key, the user has to select the desired character from small-size characters printed in each key. As a result, a user who is not accustomed to use this type of keypad has to spend much time and effort in learning to manipulate the keypad accurately.

SUMMARY OF THE INVENTION

It is, therefore, an object of the present invention to provide a keypad and a keypad assembly, which allows a user to feel a sense of clicking and thus minimizing accidental entry of another key.

According to one aspect of the present invention, there is provided a keypad, which includes an elastic layer for providing a restoring force to the keypad and an electric paper on the elastic layer, in which a plurality of key button regions for providing symbols in the form of images are defined.

According to another aspect of the present invention, there is provided a keypad assembly, which includes a keypad having an elastic layer for providing a restoring force to the keypad and an electric paper on the elastic layer, in which a plurality of key button regions for providing symbols in the form of images are defined, and a switch board under the keypad for converting a pressure applied by a user to the key button region into an electric contact.

BRIEF DESCRIPTION OF THE DRAWINGS

The above features and advantages of the present invention will become more apparent from the following detailed description when taken in conjunction with the accompanying drawings in which.

DETAILED DESCRIPTION

Exemplary embodiments of the present invention will now be described in detail with reference to the annexed drawings. For the purposes of clarity and simplicity, a detailed description of known functions and configurations incorporated herein has been omitted for conciseness.

Figure 1:
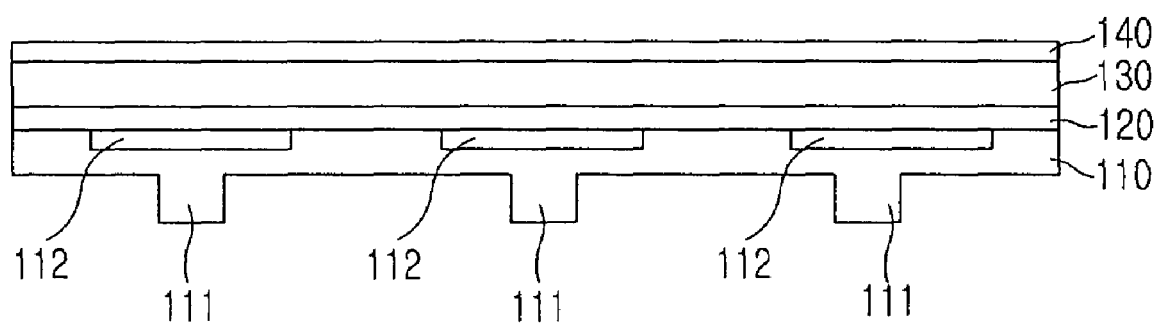
FIG. 1 illustrates a keypad according to a first embodiment of the present invention.
Figure 2A:
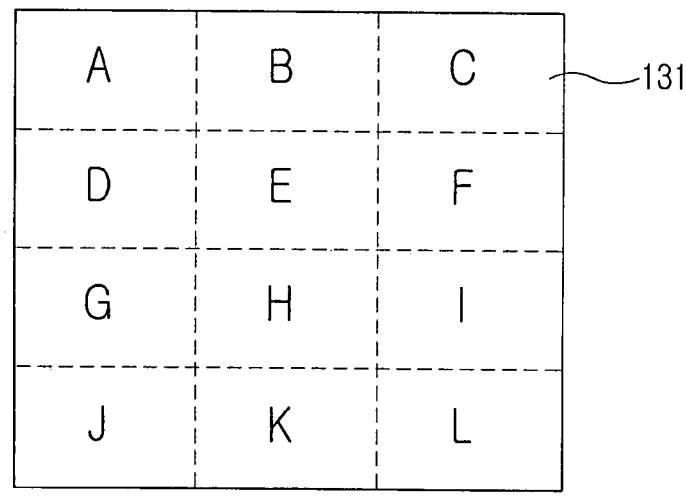
FIG. 2A illustrates the plane of an electric paper shown in FIG. 1.

FIG. 1 illustrates a keypad 100 according to a first embodiment of the present invention, and FIG. 2A illustrates the plane of an electric paper 130 shown in FIG. 1. Referring to FIGS. 1 and 2A, the keypad 100 includes an elastic layer 110 for providing a restoring force 100 to the keypad, the electric paper 130 in which a plurality of key button regions 131 for providing symbols as images are defined, a flexible printed circuit board 120 between the electric paper 130 and the elastic layer 110, and a protection member 140 on the electric paper 130.

The elastic layer 110 includes at least one protrusion 111 and at least one buffering region 112. The elastic layer 110 may be formed as one body with the protrusion 111, or the separately formed protrusion 111 may be attached to the elastic layer 110. For the elastic layer 110, a material having superior elasticity and restoring force, for example, general rubber or various synthetic resin, in addition to silicon, may be used.

The buffering region 112 is inserted into the elastic layer 110 while its one face is exposed to a portion of the top surface of the elastic layer 110 facing the flexible printed circuit board 120. The buffering region 112 minimizes damage to the electric paper 130 due to a pressure applied to the key button regions 131.

The protrusion 111 downwardly protrudes from the bottom surface of the elastic layer 110 facing the top surface of the elastic layer 110 and delivers a pressure applied through the key button region 131 to a switch (not shown), thereby allowing the user to easily recognize a pressed state of the key button region 131 clicked by the user.

The buffering region 112 and the protrusion 111 arranged downwardly from the key button region 131 and deliver a pressure applied by the user through the key button region 131.

The flexible printed circuit board 120 is positioned between the elastic layer 110 and the electric paper 130, supplies a power to the electric paper 130 and controls the power. For the flexible printed circuit board 120, writing using conductive polymer print or conductive silicon rubber may be used.

The electric paper 130 is electrically connected on the flexible printed circuit board 120 and provides symbols in the form of images to the key button region 131 under the control of the flexible printed circuit board 120. FIG. 2A illustrates the plane of the electric paper 130 in which the plurality of key button regions 131 are defined in order to provide alphabets to the user. The electric paper 130 may be partitioned to the virtual key button regions 131 as illustrated in FIG. 2A, and the key button regions 131 provide characters, symbols, and numbers in the form of images to allow user's selection.

In other words, the electric paper 130 provides information that the user desires to input in the form of images and the user may select characters, symbols, and numbers required for character coinage or number selection from among the information provided by the electric paper 130.

Figure 2B:
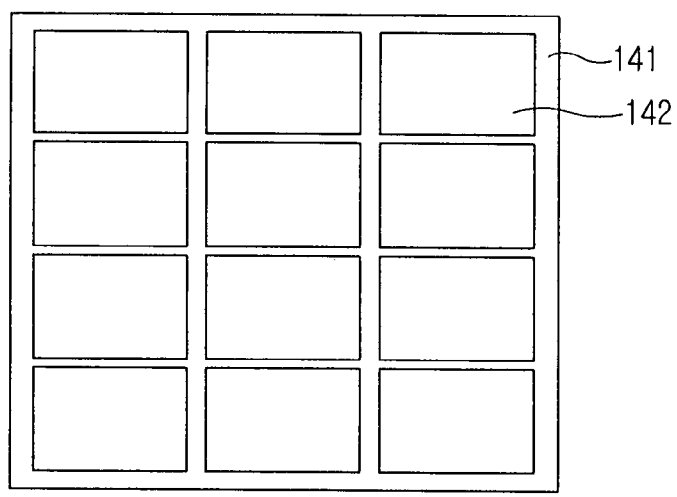
FIG. 2B illustrates the plane of a protection member shown in FIG. 1.

FIG. 2B illustrates the plane of the protection member 140 shown in FIG. 1. Referring to FIG. 2B, the protection member 140 includes a frame 141 for defining the key button region 131 and a transparent window 142 defined by the frame 141. The protection member 140 is positioned on the electric paper 130.

The frame 141 defines the boundary between the key button regions 131 to allow the user to distinguish the key button regions 131, and the window 142 is transparent to allow the user to see characters, symbols, and numbers provided in the key button regions 131 and protects the electric paper 130.

The keypad 100 according to the present invention can be implemented with a small volume through the electric paper 130 and allow the user to easily recognize the activation of the key button region 131 through the elastic layer 110 having the protrusion 111. Furthermore, since characters are provided by the electric paper 130 in the form of image information, various kinds of characters (foreign languages: the English alphabets, the Chinese characters, the Korean alphabets, the Arabic language, the Japanese language, and the Hebrew language) can be transcribed, and pictures, icons, or emoticons, in addition to characters, symbols, and numbers, can be easily selected.

Figure 3:
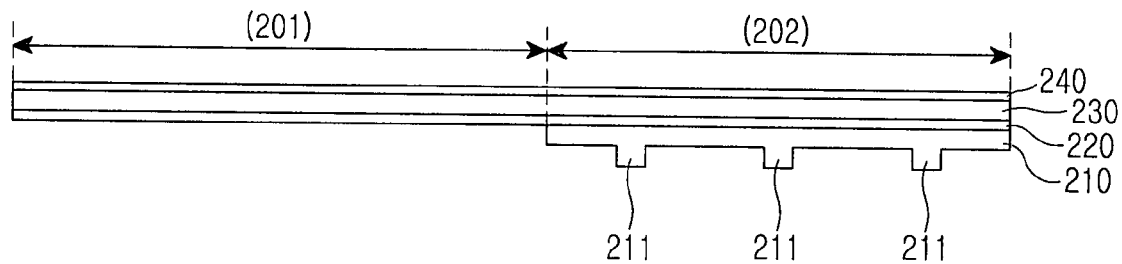
FIG. 3 illustrates a keypad according to a second embodiment of the present invention.
Figure 4:
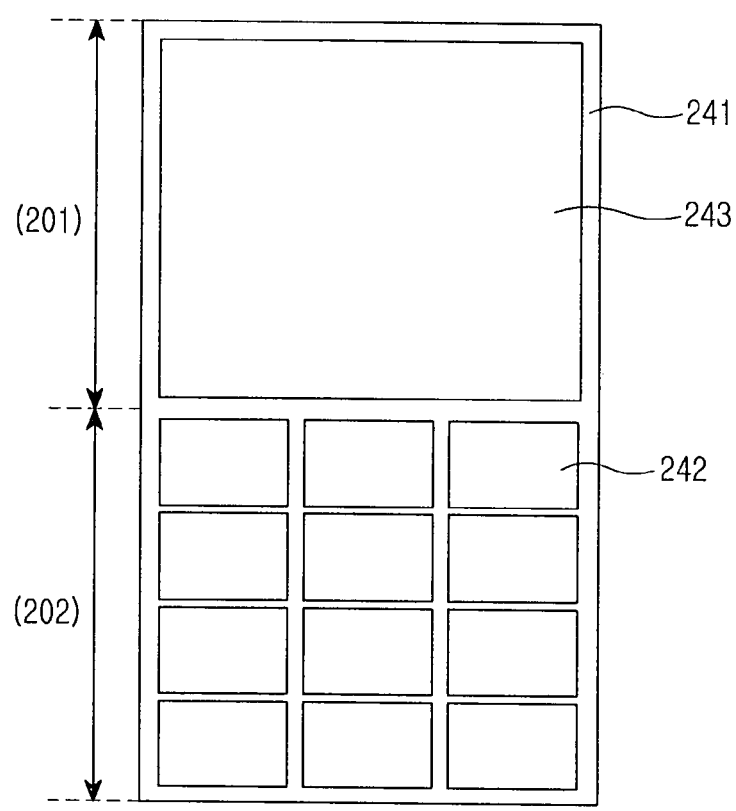
FIG. 4 illustrates the plane of a protection member shown in FIG. 3.

FIG. 3 illustrates a keypad 200 according to second embodiment of the present invention and FIG. 4 illustrates the plane of a protection member 240 shown in FIG. 3. The protection member (24) comprises a frame (241) for partitioning the electric paper, and a transparent window (242, 243) defined by the frame.

Referring to FIGS. 3 and 4, the keypad 200 includes an elastic layer 210 for providing a restoring force, an electric paper 230 in which a plurality of key button regions for providing symbols in the form of images are defined, a flexible printed circuit board 220 between the electric paper 230 and the elastic layer 210, and a protection member 240 on the electric paper 230. The elastic layer 210 is positioned under an input part 202 and includes at least one protrusion 211.

The electric paper 230 includes the input part 202 in which the key button regions are formed and a display part 201 extending from the input part 202. The input part 202 includes the key button regions, each of which provides a character, a number, and a symbol required for writing a sentence or inputting a phone number. The input part 202 is used as an input means.

The display part 201 displays a sentence generated by user input numbers, symbols, or characters to the user or provides various forms of information to the user.

The structure that is the same as that in the first embodiment of the present invention will not be described to avoid redundancy.

Figure 5:
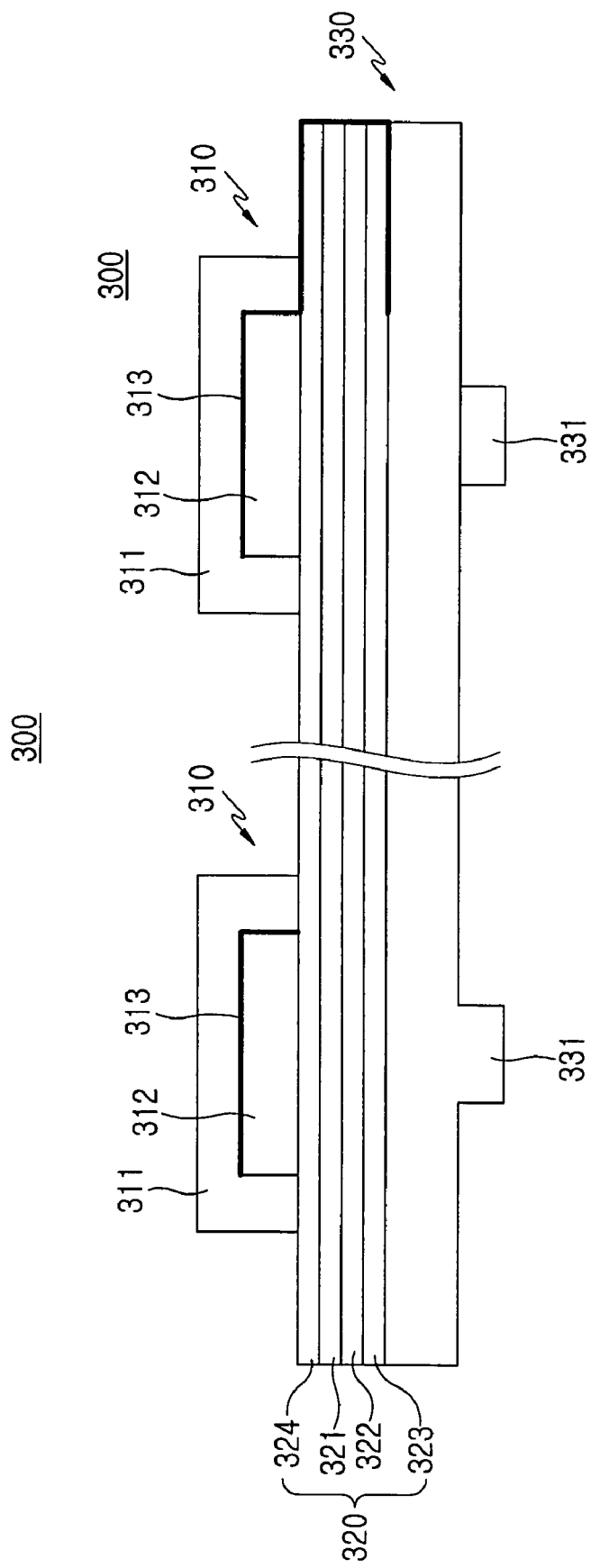
FIG. 5 illustrates a keypad according to a third embodiment of the present invention.

FIG. 5 illustrates a keypad 300 according to a third embodiment of the present invention. As shown, the keypad 300 includes a key button 310 including an electric paper 312, an electrode layer 320 including a plurality of electrodes 321, 322, 323, and 324 under the key button 310, an elastic layer 330 under the electrode layer 320, a protector 311 for protecting "E-paper" element with a shape of the key button or transparent window, a transparent electrode 313 for driving the electronic ink of the transparent common electrode E-paper, and an actuator 331, which is similar to the keypad actuator 111 of FIG. 1. Note that electronic paper 312 is driven by an electric field, such as electrophoretic e-paper.

The electrode layer 320 includes first through third electrodes 321-323 that are sequentially positioned from a ground electrode 324 under the key button 310 contacting the elastic layer 330 to the top surface of the elastic layer 330. The electrode layer indicates the electrodes 320-323. Each layer has the respectively different electrodes from each other, wherein the electrode shape is shown on the electronic paper when the potential difference between the layer and the common electrode is applied. Also, the electrodes shapes are shown by overlapped when the potential difference between one or more electrode among the electrodes 320-323 and the common electrode is applied. Therefore, the electrodes can drive at the same time in case of being necessary to show the electrode shapes of different electrodes layers.

Figure 6A:
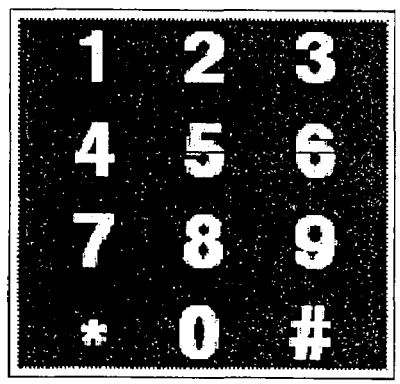
FIGS. 6A through 6C illustrate the planes of first through third electrodes shown in FIG. 5.
Figure 6B:
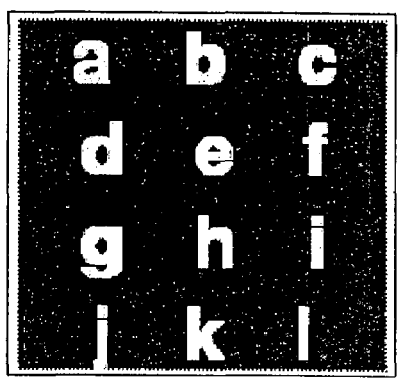
Figure 6C:
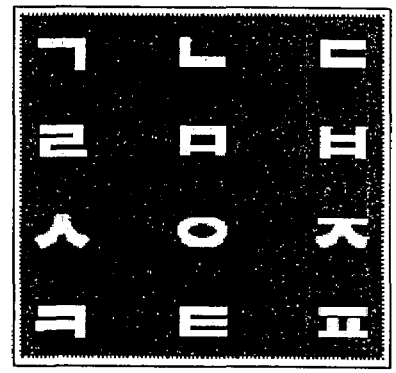

FIGS. 6A through 6C illustrate the planes of the first through third electrodes 321-323 shown in FIG. 5. The first electrode 321 of FIG. 6A provides Arabic numbers, the second electrode 322 of FIG. 6B provides alphabets, and the third electrode 323 of FIG. 6C provides the Korean consonants. Note that various forms of characters or symbols in addition to examples shown in FIGS. 6A through 6C may be provided to the user.

As described above, the keypad including the electric paper according to the present invention can be implemented as being slim, and allows the user to feel the press of a key button region and thus to accurately input a desired key button.

Moreover, according to the present invention, since character information can be selected, various forms of foreign language characters in addition to the English alphabets and the Korean alphabets can be used.

While the present invention have been shown and described with reference to preferred embodiments thereof, it will be understood by those skilled in the art that various changes in form and details may be made therein without departing from the spirit and scope of the invention.

What is claimed is:

1. A keypad comprising:
   an elastic layer for providing a restoring force to the keypad; and
   an electric paper on the elastic layer, in which a plurality of key button regions for providing symbols in the form of images are defined; and
   a flexible circuit board positioned on the electric paper.

2. The keypad of claim 1, further comprising a buffering region for each of the key button regions, which is formed in a portion of the elastic layer between the elastic layer and the electric paper.

3. The keypad of claim 1, wherein the elastic layer comprises a plurality of protrusions that downwardly protrude from the bottom surface of the elastic layer.

4. The keypad of claim 1, further comprising:
a protection member positioned on the electric paper.

5. The keypad of claim 4, wherein the protection member comprises:
a frame for partitioning the electric paper; and
a transparent window defined by the frame.

6. The keypad of claim 1, wherein the electric paper comprises an input part in which the key button regions are formed and a display part extending from the input part.

7. The keypad of claim 1, wherein said electric paper comprises a plurality of sequentially positioned different electrodes and a common electrode, each of said plurality of sequentially positioned different electrodes including a select form of said symbols, wherein said sequentially positioned electrodes are selected by applying a potential difference between one of the different electrodes and the common electrode.

8. The keypad of claim 1, wherein the flexible circuit board is configured to supply a power to the electric paper.

9. A keypad assembly comprising:
a keypad comprising:
an elastic layer for providing a restoring force to the keypad; and
an electric paper on the elastic layer, in which a plurality of key button regions for providing symbols in the form of images are defined;
a flexible circuit board positioned on the electric paper; and
a switch board under the keypad for converting a pressure applied by a user to the key button region into an electric contact.

10. The keypad assembly of claim 9, wherein the keypad further comprises:
a buffering region for each of the key button regions, which is formed in a portion of the elastic layer between the elastic layer and the electric paper;
a protection member positioned on the electric paper.

11. The key assembly of claim 9, wherein the elastic layer comprises a plurality of protrusions that downwardly protrude from the bottom surface of the elastic layer.

12. The keypad assembly of claim 9, wherein the electric paper comprises an input part in which the key button regions are formed and a display part extending from the input part.

13. The keypad assembly of claim 9, wherein, said electric paper comprises a plurality of sequentially positioned different electrodes and a common electrode, each of said plurality of sequentially positioned different electrodes including a select form of said symbols, wherein said sequentially positioned electrodes are selected by applying a potential difference between one of the different electrodes and the common electrode.

14. A key pad comprising:
at least one key button including an electric paper inserted into the key button;
a plurality of electrode layers deposited sequentially under the key button and each having a plurality of symbols; and
an elastic layer under the plurality of electrode layers.

15. The keypad of claim 14, wherein the elastic layer comprises at least one protrusion from the bottom surface of the elastic layer.

* * * * *